June 27, 1950      J. BORSOS      2,513,136

ELECTROLYTIC GAS GENERATOR AND POWER PLANT

Filed Sept. 13, 1948

Joseph Borsos
INVENTOR.

Patented June 27, 1950

2,513,136

UNITED STATES PATENT OFFICE 2,513,136

ELECTROLYTIC GAS GENERATOR AND POWER PLANT

Joseph Borsos, Dearborn, Mich.

Application September 13, 1948, Serial No. 48,953

3 Claims. (Cl. 60—22)

1

This invention relates to power plants of the buoyancy type embodying an upright endless chain of buckets arranged within a casing containing a body of liquid to such a level that the buckets pass mouth up downwardly into and through the liquid and then invert to pass mouth down upwardly through and out of said liquid, and means to supply a gaseous medium to said buckets as they invert below the surface of the liquid so as to displace the liquid therefrom and render the same buoyant, thereby giving motion to the chain of buckets due to tendency of the gas filled buckets to rise to the surface of the liquid.

Power plants of the above kind have heretofore employed water as a liquid in the casing, and the gaseous medium has consisted of air or steam solely utilized for the generation of power and supplied from an outside generator or source to a discharge pipe or nozzle entering the casing near the bottom and at that side toward which the buckets present themselves mouth down.

The primary object of the present invention is to place the endless chain of buckets within the casing of an electrolytic gas generator, so as to generate power by use of the gas as the latter is produced in said generator for commercial or other useful purposes. In this way, only a single unit is required, and gas primarily generated for another useful purpose is also utilized for the generation of power. The gas generator is generally of a well known or conventional type wherein an electrolyte within a casing is subjected to the action of an electric current therein by ordinary means including a pair of spaced electrodes. The one distinguishing characteristic of the present invention, however, is that the electrodes are disposed in the bottom and at that side of the casing toward which the buckets present themselves mouth down, whereby the gas passes upwardly to displace the electrolyte from the buckets directly as said gas is generated below the surface of said electrolyte. Any suitable kind of electrolyte may be used, depending upon the kind of gas to be produced or the purpose for which the gas is to be employed after being piped from the generator and stored or utilized outside or independently of the latter. The electrolyte may be a liquid which is itself convertible to gas, or a liquid containing material which is convertible to gas by electrolysis.

The exact nature of the present invention will become apparent from the following description when considered in connection with the accompanying drawing, in which:

2

Figure 3:
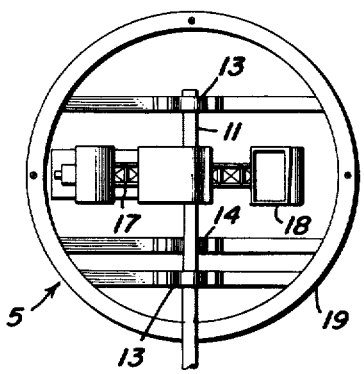
Figure 3 is a horizontal section taken on the line 3—3 of Figure 1.
Figure 1:
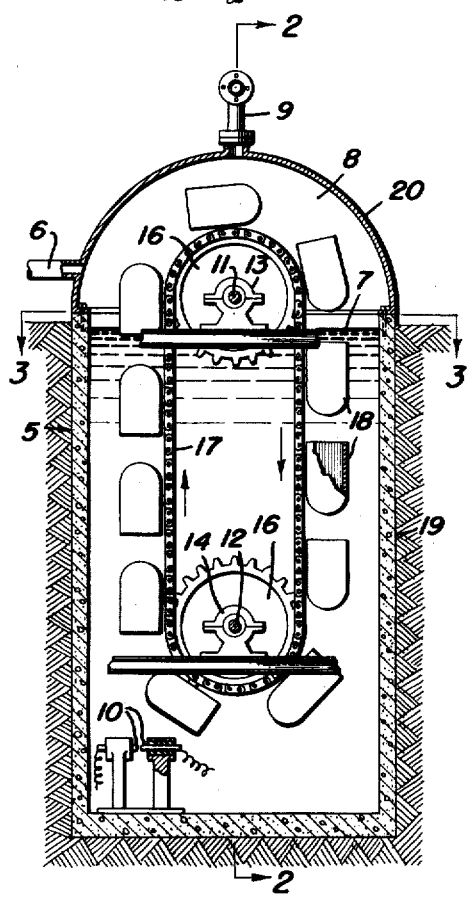
Figure 1 is a view, partly in elevation and partly in vertical section, of a gas generator and power plant embodying the present invention.
Figure 2:
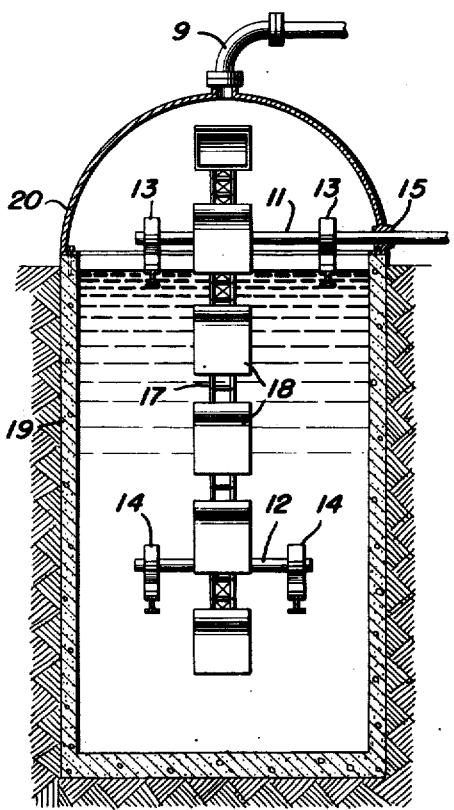
Figure 2 is a vertical section thereof taken substantially on line 2—2 of Figure 1.

Referring in detail to the drawing, the present invention includes a conventional type of electrolytic gas generator having a closed casing 5 adapted to be filled and suitably supplied through a pipe 6 or the like with an electrolyte to a predetermined level 7 so as to define a gas collection space 8 within the top portion of said casing. The casing also has a top gas outlet pipe 9 which may lead to a suitable storage tank. Ordinary means, including spaced electrodes 10, may be provided for subjecting the electrolyte to the action of an electric current so as to generate gas by electrolysis.

In accordance with the present invention, two horizontal shafts 11 and 12 are journalled in bearings 13 and 14, one above the other, within the generator casing 5, the upper shaft 11 being above the level 7 of the electrolyte and projecting through a side of the casing as at 15 to transmit power. The shafts 11 and 12 have sprocket wheels 16 secured thereon, and an endless sprocket chain 17 passes around these sprocket wheels and has a series of buckets 18 attached thereto. The buckets are arranged to present their mouths upward and be filled with the electrolyte while moving downwardly at one side and to present their mouths downward while moving upwardly at the other side. The electrodes 10 are disposed near the bottom and at that side of the casing toward which the buckets present themselves mouth down, so that the gas generated passes upwardly directly into the inverted buckets to displace the electrolyte therefrom and render the same buoyant, thereby giving the chain of buckets motion due to tendency of the buoyant buckets to rise to the surface of the electrolyte. In this way, the shaft 11 is driven and may transmit power to any apparatus or machine.

The casing 5 preferably consists of a lower open top concrete section 19 embedded in the ground, and a metallic upper dome section 20 secured thereon.

From the foregoing description, it is believed that the construction, operation and advantages of the present invention will be readily understood and appreciated by those skilled in the art.

As the generation of gas by electrolysis is well known, and as electrodes are commonly employed in generators of this type, it is believed unnecessary to disclose or discuss this phase of the present invention in more detail. The electrodes will be included in a conventional way within a proper electrical circuit which is properly controlled, and the only novelty in the generator per se is the particular arrangement of the electrodes with respect to the endless chain of buckets, and the specific construction of the generator casing. Minor changes are contemplated, such as fairly fall within the spirit and scope of the invention as claimed.

Having described the invention, what is claimed as new is:

1. An electrolytic gas generator and power plant comprising, in combination, an electrolytic gas generator adapted to generate gas for commercial or like purposes and including a closed casing adapted to be filled and suitably supplied with an electrolyte to a predetermined level so as to define a gas collection space within the top portion of said casing, said casing having a top gas outlet pipe, conventional means including spaced electrodes for subjecting the electrolyte to the action of an electric current so as to generate gas by electrolysis, and an upright endless chain of buckets arranged within the casing so as to pass mouth up downwardly into and through the electrolyte and then invert to pass mouth down upwardly through and out of said electrolyte, said electrodes being disposed near the bottom and at that side of the casing toward which buckets present themselves mouth down, whereby the gas generated passes upwardly directly into the inverted buckets to displace the electrolyte therefrom and render the same buoyant, said endless chain of buckets passing around an upper sprocket wheel disposed near the top of the casing and secured on a driven shaft extending outwardly through one side of the casing for transmitting power.

2. In combination with a commercial electrolytic gas generator comprising a casing adapted to contain an electrolyte and to define a gas collection chamber above the electrolyte, conventional means including spaced electrodes for subjecting the electrolyte to the action of an electric current for generating gas by electrolysis, an upright endless chain of buckets arranged within the casing so as to pass mouth up downwardly into and through the electrolyte and then invert to pass mouth down upwardly through and out of said electrolyte, a driven shaft journalled near the top of and extending through one side of the casing and driven by said chain of buckets, and means to conduct gas from said collection space, said electrodes being disposed near the bottom and at that side of the casing toward which the buckets present themselves mouth down so that the gas generated passes upwardly directly into the inverted buckets to displace the electrolyte and render the buckets buoyant.

3. The construction defined in claim 2 wherein the casing comprises an open top lower concrete section embedded in the ground, and a metallic dome secured on said concrete section above the ground and forming the gas collection space therein.

JOSEPH BORSOS.

REFERENCES CITED

The following references are of record in the file of this patent:

UNITED STATES PATENTS

| Number | Name | Date |
| --- | --- | --- |
| 1,916,235 | Ruben | July 4, 1933 |

FOREIGN PATENTS

| Number | Country | Date |
| --- | --- | --- |
| 21,958 | Austria | Nov. 10, 1905 |